United States Patent Office 2,871,269
Patented Jan. 27, 1959

2,871,269
PREPARATION OF KETO ETHERS

Nicholas B. Lorette, Lake Jackson, Tex., assignor to The Dow Chemical Company, Midland, Mich., a corporation of Delaware No Drawing. Application March 8, 1957
Serial No. 644,718

6 Claims. (Cl. 260—594)

This invention relates to a process for the preparation of keto ethers, and more particularly, to a process for the preparation of keto ethers by the reaction of alpha-beta unsaturated ketones with primary alcohols in the presence of a strongly acidic cation exchange resin.

Numerous processes have been described for the preparation of keto ethers by the reaction of alpha-beta unsaturated ketones and a primary alcohol. In these processes a variety of catalysts have been proposed among which are alkaline substances, such as alkali metal and alkaline earth metal hydroxides and mineral acids, such as sulfuric acid. The alkaline catalysts have been predominantly used, since better conversions and a more rapid rate of reaction are obtained with these catalysts. With alkaline catalysts, conversions of around 50 percent are obtained during a reaction time of from 4 to 8 hours. With acid catalysts the conversions are only in the range of 20 to 25 percent and the reaction time extends into days.

The use of either the mineral acids or the hydroxides as a catalyst presents a considerable disadvantage in that these catalysts must be neutralized at the conclusion of the reaction. Upon neutralization of the catalyst, inorganic salts are formed in the reaction mixture which complicates the recovery of the keto ether. Without the presence of the inorganic salts, the keto ether may be readily separated from the reaction mixture by distillation. In addition to the formation of inorganic salts, the neutralization reaction is highly exothermic, often resulting in overheating of the reaction mixture and thus the formation of undesirable by-products. A process whereby the alpha-beta unsaturated ketones and alcohols are reacted without the use of acids or hydroxides as catalysts would readily simplify and improve the preparation of the keto ethers by this reaction.

It has been now discovered that keto ethers may be prepared by the reaction of an alpha-beta unsaturated ketone with a primary alcohol by intermixing the reactants in the presence of a strongly acidic cation exchange resin in the hydrogen form. By this process no inorganic salts are formed in the reaction mixture to complicate the recovery of keto ether. Conversions up to 57 percent may be obtained with a reaction time considerably less than that required even for the heretofore used alkaline catalysts.

The good conversions, high yields, and the rapid rate of reaction obtained by the use of a strongly acidic cation exchange resin are totally unexpected. The low conversions and exceedingly slow rate of reaction characteristic of the acid catalyzed reaction would indicate that an acidic catalyst, such as a cation exchange resin would also be ineffective. However, the strongly acidic cation exchange resins are far superior to even the best alkaline catalysts heretofore employed.

A variety of the keto ethers may be prepared by the instant process by the reaction of different alpha-beta unsaturated ketones with different primary alcohols. The alpha-beta unsaturated ketones which may be used are ketones having the general formula:

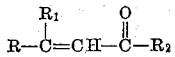

where R and $R_1$ represent a member of the group consisting of methyl and ethyl radicals and hydrogen and $R_2$ represents a member of the group consisting of methyl and ethyl radicals. Illustrative examples of these ketones are methyl vinyl ketones, 3-penten-2-one, mesityl oxide, homomesityl oxide, 3-hexen-2-one, and 2-methyl-3-hepten-5-one. Suitable primary alcohols which may be reacted with the above ketones are saturated and unsaturated aliphatic primary alcohols; preferably the lower aliphatic primary alcohols having not more than 5 carbon atoms. Illustrative examples of the unsaturated aliphatic alcohols that may be used are allyl alcohol, methallyl alcohol, crotyl alcohol, isocrotyl alcohol, and so forth. Representative saturated aliphatic alcohols are methyl alcohol, ethyl alcohol, n-propyl alcohol, n-butyl alcohol, isobutyl alcohol, n-amyl alcohol, and the like. While the strongly acidic cation exchange resin is especially effective in catalyzing the reaction with the lower aliphatic primary alcohols, substituted primary alcohols containing groups which are substantially non-reactive at the reaction conditions may also be used. Ether and phenyl groups are illustrative of some of these substituent groups which are non-reactive. Examples of the substituted primary alcohols include benzyl alcohol, methyl Cellosolve, and so forth.

Theoretically, in the reaction one mole of the alpha-beta unsaturated ketone reacts with one mole of the alcohol. However, since the reaction depends upon the equilibrium established between the reactants and the products, an excess of either the ketone or alcohol will increase the conversions. The primary alcohols are the most readily available and easily removed from the reaction. Thus, it is preferred to use an excess of the alcohol. The molar ratios of the alcohol to ketone generally used are from 2:1 to 4:1. Greater ratio of alcohol to ketone up to 10:1 may be used, but the increase in conversions obtained with this larger excess is offset by the disadvantage of having a larger amount of alcohol from which the keto ether must be removed.

Low temperatures also favor higher conversions of the alcohol and the ketone to keto ethers. Although temperatures as low as the freezing point of the reaction mixture may be used, the cost of refrigeration to obtain these low temperatures makes it economically impractical. Thus, for economical reasons it is preferred to operate close to room temperature, in the range of 15° to 35° C. While good conversions may still be obtained at temperatures close to the boiling point of the mixture, there are no beneficial advantages gained by use of these high temperatures.

The strongly acidic cation exchange resins in the hydrogen form may be used as catalyst. The sulfonic type, such as described in United States Letters Patents Numbers 2,597,438, 2,500,149, and 2,366,007 are preferred, particularly the sulfonated copolymers of styrene and divinylbenzene as described in the United States Patent Number 2,500,149.

It is apparent that either a batch, semi-continuous, or a continuous process may be used in contacting the reactants with the ion exchange resin. A continuous process where the reactants are passed through a resin bed is preferred. The alpha-beta unsaturated ketone and the alcohol can be intermixed prior to introduction in the bed or charged separately.

While the contact time is not critical, the optimum contact time of the reactants with the resin will vary with the particular ketone and alcohol reacted and also will vary somewhat with the particular resin employed. In a reaction of mesityl oxide with methyl alcohol, a feed rate through the resin bed from around 0.1 to 0.75 milliliter of feed per hour per milliliter of resin is generally used. At these feed rates the actual retention time of the reactants in the bed varies from around two hours to fifteen minutes. The preferred feed rate is in the range of 0.2 to 0.5 milliliter of feed per hour per milliliter of resin which corresponds approximately to a retention time of 90 to 45 minutes.

The following examples further illustrate the invention but are not to be construed as limiting it thereto.

Example I

A vertical Pyrex tube, 1.9 centimeters I. D., was filled with a strongly acidic cation exchange resin in hydrogen form. The resin was of the sulphonic type described in U. S. Letters Patent Number 2,500,149 and sold by The Dow Chemical Company under the trademark of "Dowex–50." The resin bed had a volume of 197 milliliters of which 45 milliliters was free space.

A series of runs was made where an equal volume of methanol and mesityl oxide (2.86 moles of methanol per mole of mesityl oxide) was intermixed and passed through the resin bed at room temperature (25° C.) at a different feet rate for each run. The crude product or the effluent from the resin bed was distilled at 200 millimeters of mercury pressure until all of the methanol was removed. The pressure was then reduced to 40 millimeters of mercury and the distillation continued. Mesityl oxide was removed at 42° C. at this pressure and the 4-methoxy-4-methyl-2-pentanone distilled off at 74° C. A high boiling residue remained. From the products recovered by distillation, the conversions and yields based upon the reacted mesityl oxide were calculated.

The results obtained and pertinent details are given in the table below.

| Feed Rate, ml./min. | Mesityl Oxide, Percent Conversion | Percent Yield |
|---|---|---|
| 0.377 | 57.0 | 88.2 |
| 0.616 | 56.6 | 93.7 |
| 1.29 | 46.5 | 94.0 |
| 2.41 | 40.9 | 94.0 |

The 4-methoxy-4-methyl-2-pentanone had an index of refraction of 1.4180 at 20° C., a density of 0.901 gm./ml. at 25° C., and a boiling point of 48° C. at 10 millimeters of pressure.

Example II

The resin bed described in Example I was used in the preparation of 4-ethoxy-4-methyl-2-pentanone. A mixture of 1 volume of mesityl oxide and 1.3 volumes of anhydrous ethanol was passed through the resin bed at a temperature of 25° C. and at a rate of 0.552 milliliter per minute. The crude product obtained after the mixture was contacted with the resin was distilled at 170 millimeters of pressure until all of the ethanol was removed and then at 40 millimeters of pressure for the removal of mesityl oxide. The 4-ethoxy-4-methyl-2-pentanone was distilled off at 20 millimeters of mercury pressure at a temperature of around 67° C. After the distillation of the 4-ethoxy-4-methyl-2-pentanone, 37 grams of a high boiling residue remained. A conversion of 27.7% and a yield of 81.2 percent based upon the unrecovered mesityl oxide was obtained. The 4-ethoxy-4-methyl-2-pentanone had an index of refraction of 1.4152 at 23°, a density of 0.886 at 25° C., and a boiling point of 56° C. at 10 millimeters of mercury pressure absolute.

Example III

In a manner similar to that of the foregoing Examples I and II, other alcohols may be substituted for the methyl and ethyl alcohol shown, such as, for example, allyl alcohol, propyl alcohol, methallyl alcohol, crotyl alcohol, isopropanol, the butanols, pentanols, and hexanols, etc., and, other alpha-beta unsaturated ketones, such as, for example, methyl vinyl ketone, 3-penten-2-one, homomesityl oxide, 3-hexene-2-one, 2-methyl-3-hepten-5-one, etc., may be substituted for mesityl oxide specifically shown to prepare corresponding keto ethers.

What is claimed is:

1. A process for the preparation of keto ethers, which comprises intermixing, in the presence of a strongly acidic cation exchange resin in the hydrogen form, a primary alcohol with an alpha-beta unsaturated ketone having the general formula:

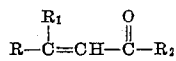

where R and $R_1$ are members of the group consisting of methyl and ethyl radicals and hydrogen and $R_2$ represents a member of the group consisting of methyl and ethyl radicals.

2. A process for the preparation of keto ethers, which comprises intermixing a primary alcohol with mesityl oxide in the presence of a strongly acidic cation exchange resin in the hydrogen form, and recovering the keto ether formed.

3. A process for the preparation of 4-alkoxy-4-methyl-2-pentanone, which comprises intermixing mesityl oxide with a lower aliphatic primary alcohol having less than 6 carbon atoms in the presence of a strongly acidic cation exchange resin in the hydrogen form, and recovering the 4-alkoxy-4-methyl-2-pentanone formed.

4. A process for the preparation of 4-methoxy-4-methyl-2-pentanone, which comprises intermixing mesityl oxide with methanol in the presence of a strongly acidic cation exchange resin in the hydrogen form, and recovering the 4-methoxy-4-methyl-2-pentanone formed.

5. A continuous process for the preparation of 4-methoxy-4-methyl-2-pentanone, which comprises continuously charging methanol and mesityl oxide in proportions in the range of 2 to 4 moles of methanol per mole of mesityl oxide into a bed of a strongly acidic cation exchange resin in the hydrogen form, passing the methanol and mesityl oxide through the resin bed, continuously discharging an effluent from the resin bed, and separating the 4-methoxy-4-methyl-2-pentanone from the effluent.

6. A continuous process for the preparation of 4-ethoxy-4-methyl-2-pentanone, which comprises continuously charging ethanol and mesityl oxide in proportions in the range of 2 to 4 moles of ethanol per mole of mesityl oxide into a bed of a strongly acidic cation exchange resin in the hydrogen form, passing the ethanol and mesityl oxide through the resin bed, continuously discharging an effluent from the bed, and separating the 4-ethoxy-4-methyl-2-pentanone from the effluent.

References Cited in the file of this patent

UNITED STATES PATENTS

| 1,729,255 | Hoffman | Sept. 24, 1929 |
| 2,217,167 | Halbig et al. | Oct. 8, 1940 |

OTHER REFERENCES

Helffirich Angew. Chem., vol. 66, pp. 241–6 (1954).
Nachod et al.: Ion Exchange Technology, pp. 279–81 (1956).